United States Patent
Xu et al.

(10) Patent No.: US 10,308,252 B2
(45) Date of Patent: Jun. 4, 2019

(54) METHOD OF CONTROLLING A POWERTRAIN

(71) Applicant: Ford Global Technologies, LLC, Dearborn, MI (US)

(72) Inventors: Yang Xu, Dearborn, MI (US); Zhengyu Dai, Canton, MI (US); Guopeng Hu, Northville, MI (US); Hong Jiang, Birmingham, MI (US); Bradley D. Riedle, Northville, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 23 days.

(21) Appl. No.: 15/701,802

(22) Filed: Sep. 12, 2017

(65) Prior Publication Data

US 2019/0077403 A1    Mar. 14, 2019

(51) Int. Cl.
*B60W 10/02*     (2006.01)
*B60W 30/18*     (2012.01)
*B60W 10/115*    (2012.01)
*B60W 10/06*     (2006.01)

(52) U.S. Cl.
CPC ...... *B60W 30/18054* (2013.01); *B60W 10/02* (2013.01); *B60W 10/06* (2013.01); *B60W 10/115* (2013.01); *B60W 2510/0275* (2013.01); *B60W 2510/1005* (2013.01); *B60W 2520/04* (2013.01); *B60W 2540/10* (2013.01); *B60W 2540/12* (2013.01); *B60W 2710/027* (2013.01); *B60W 2710/0666* (2013.01); *B60W 2710/1005* (2013.01)

(58) Field of Classification Search
CPC ......... B60W 30/18054; B60W 10/115; B60W 10/02; B60W 10/06; B60W 2710/1005; B60W 2540/12; B60W 2710/027; B60W 2540/10; B60W 2520/04; B60W 2510/0275; B60W 2510/1005; B60W 2710/0666
See application file for complete search history.

(56) References Cited

U.S. PATENT DOCUMENTS

| | | | |
|---|---|---|---|
| 5,795,262 | A | 8/1998 | Robinson |
| 6,171,211 | B1 | 1/2001 | Ortmann et al. |
| 6,440,041 | B1 | 8/2002 | Riedle et al. |
| 6,634,984 | B1 | 10/2003 | Doering et al. |
| 6,926,639 | B2 | 8/2005 | Hopper |

(Continued)

*Primary Examiner* — David J Hlavka
(74) *Attorney, Agent, or Firm* — David Kelley; Brooks Kushman, P.C.

(57) ABSTRACT

To reduce fuel consumption, a transmission is shifted into a neutral state, called neutral idle, when a vehicle stops in a drive mode. During a transition from a neutral idle state to an engaged state, the engine torque is controlled to avoid excessive shift energy and to mitigate acceleration drop. Specifically, the engine torque is set to a level equal to a sum of a transmission torque capacity and an offset, which is a function of accelerator pedal position. The transmission torque capacity is calculated based on the engaging shift element torque capacity and torque ratios associated with the kinematics and the torque converter. To accommodate noise factors such as variation over time, the offset function is adapted in response to measured clutch energy and acceleration drop.

17 Claims, 4 Drawing Sheets

(56) References Cited

U.S. PATENT DOCUMENTS

| | | | |
|---|---|---|---|
| 8,002,058 B2* | 8/2011 | Ishikawa | B60W 30/02 180/65.265 |
| 9,316,308 B2 | 4/2016 | Lochocki, Jr. et al. | |
| 9,958,059 B2* | 5/2018 | Hu | F16H 61/0213 |
| 2013/0041533 A1* | 2/2013 | Kim | B60K 6/365 701/22 |
| 2015/0198247 A1* | 7/2015 | Yahagi | B60K 31/0058 701/52 |

* cited by examiner

METHOD OF CONTROLLING A POWERTRAIN

TECHNICAL FIELD

This disclosure relates to the field of control systems for vehicles having an automatic transmission. More particularly, the disclosure relates to a control strategy for controlling an engine while transitioning from a neutral idle state to a drive state.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

Discrete ratio transmissions are capable of transmitting power via various power flow paths, each associated with a different speed ratio. A particular power flow path is established by engaging particular shift elements, such as clutches or brakes. Shifting from one gear ratio to another involves changing which shift elements are engaged. In many transmissions, the torque capacity of each shift element is controlled by routing fluid to the shift elements at controlled pressure. A controller adjusts the pressure by sending electrical signals to a valve body.

SUMMARY OF THE DISCLOSURE

A method of controlling a vehicle powertrain includes disengaging a shift element to place a transmission in a neutral idle state, commanding an increase in torque capacity of the shift element to transition back to an engaged state. A rate of increase of the torque capacity of the shift element may be based on an accelerator pedal position. The transition into the neutral idle state happens in response to the vehicle stopping in a drive mode. The transition back to the engaged state happens in response to release of a brake pedal. During the transition to the engaged state, an engine torque is commanded equal to a sum of a transmission torque capacity and an offset, wherein the offset is a function of the accelerator pedal position. The torque capacity may be calculated by multiplying a torque capacity of the shift element by a torque converter torque multiplication ratio and also by a torque ratio between the shift element and a turbine shaft.

The method may further include adapting the offset for future neutral idle events. Specifically, in response to a clutch energy during the transition exceeding a threshold, the offset may be decreased such that, during a subsequent transition from the neutral state to the engaged state at the same accelerator pedal position, a lower engine torque is commanded. In response to a clutch energy during the transition not exceeding the threshold, the offset may be increased such that, during a subsequent transition from the neutral state to the engaged state at the same accelerator pedal position, a higher engine torque is commanded. The amount of the increase may be proportional to an acceleration drop during the transition.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
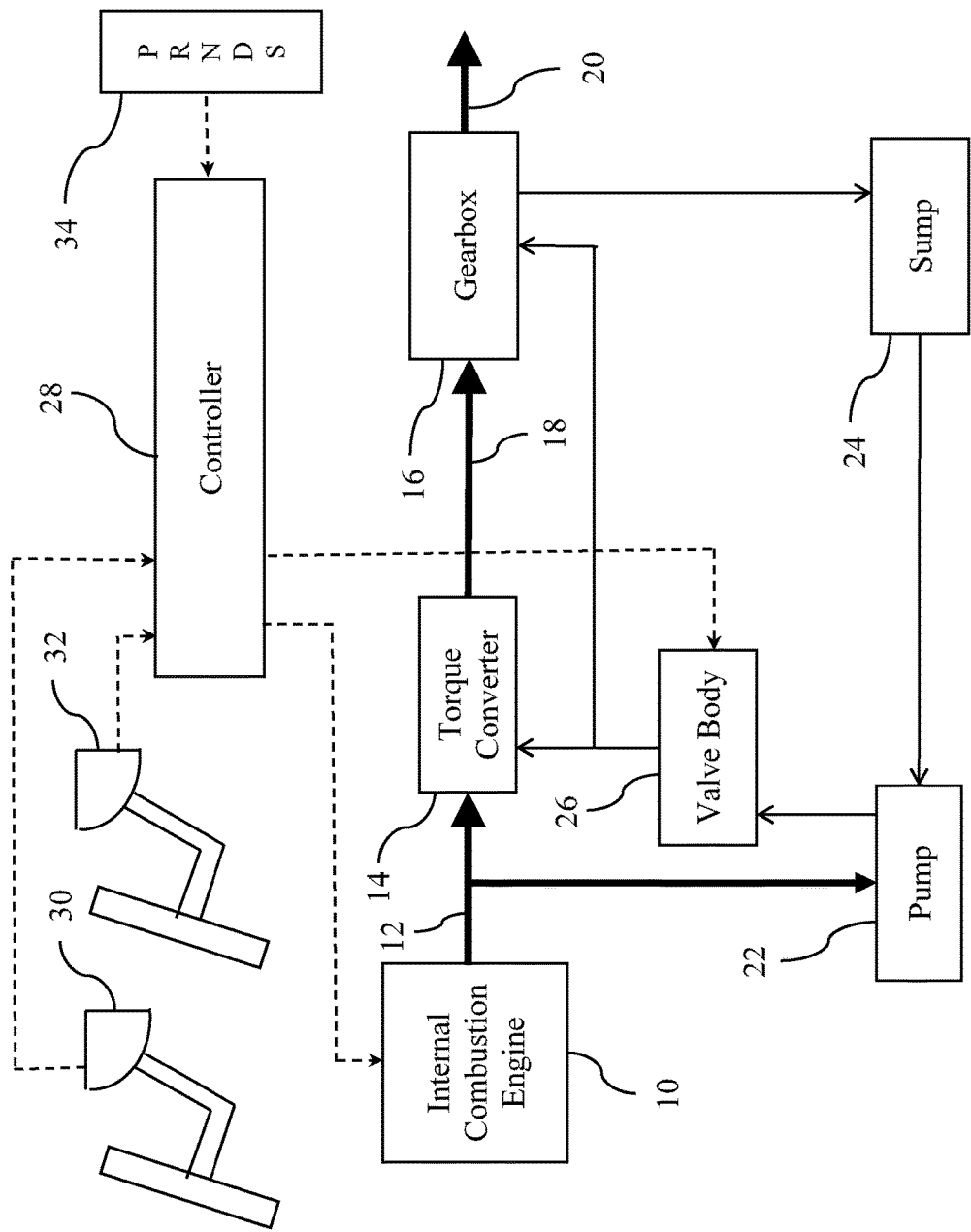
FIG. 1 is a schematic diagram of a vehicle powertrain system.

An example vehicle powertrain is schematically illustrated in FIG. 1. The flow of mechanical power is indicated by bold solid lines. Narrow solid lines indicate the flow of fluid. Dashed lines indicate the flow of information signals. Power is provided by internal combustion engine 10 which drives transmission input shaft 12. The transmission includes a torque converter 14 and a gearbox 16. Torque converter 14 includes an impeller fixed to transmission input shaft 12 and a turbine fixed to turbine shaft 18. When transmission input shaft 12 rotates faster than turbine shaft 18, the torque converter exerts positive torque on turbine shaft 18 and a exerts a negative torque on shaft 12 resisting engine rotation. When shaft 12 rotates substantially faster than shaft 18, the torque converter multiplies the torque such that the torque exerted on turbine shaft 18 is higher than the torque produced by the engine. Torque converter 14 also includes a lockup clutch which transmits torque without relative speed.

Gearbox 16 provides a variety of speed ratios and torque multiplication factors between turbine shaft 18 and transmission output shaft 20. Transmission output shaft 20 is drivably connected to the vehicle wheels, typically via fixed ratio final drive gearing and a differential. Gearbox 16 alternately establishes at least one neutral state, at least one reverse gear ratio, and multiple forward gear ratios. Gearbox 16 includes a plurality of shift elements such as brakes and clutches that are engaged to establish the power flow paths associated with the reverse gear ratio and the forward gear ratios.

Engine driven pump 22 draws fluid from sump 24 and sends the fluid, at elevated pressure, to valve body 26. In response to signals from controller 28, the valve body sends pressurized fluid to the apply chambers of the torque converter lockup clutch and the shift elements within gearbox 16. Controller 28 controls the torque capacity of the shift elements by varying the commanded pressure of fluid routed to the respective apply chambers. Controller 28 also sends signals to engine 10 to adjust the torque supplied to transmission input shaft 12. Controller 28 utilizes signals from a number of sensors including accelerator pedal sensor 30, brake pedal sensor 32, and shift selector 34 which are operated by the driver.

Figure 2:
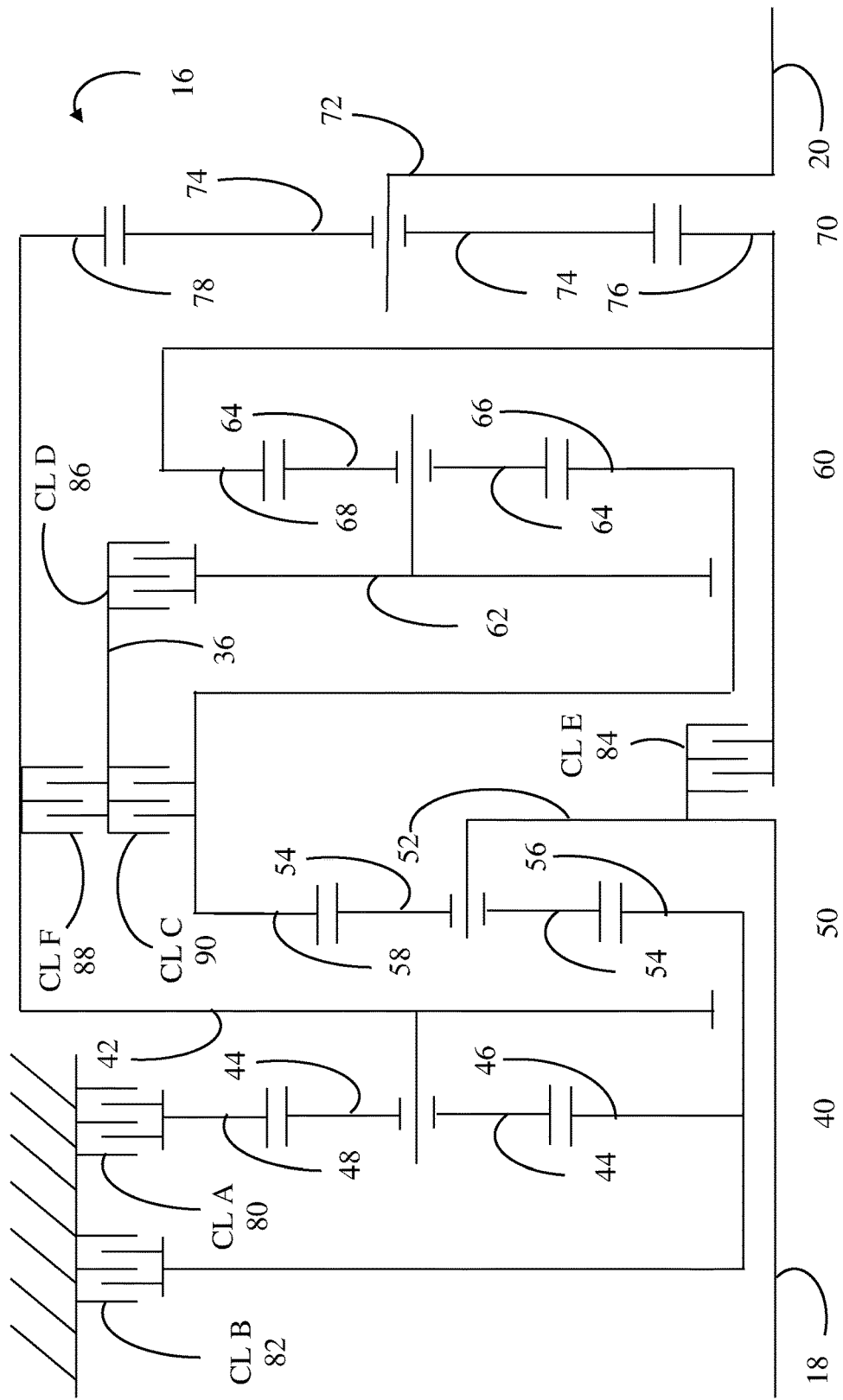
FIG. 2 is a schematic diagram of a planetary transmission gearbox.

An example transmission gearbox 16 is schematically illustrated in FIG. 2. By selectively engaging specified subsets of the shift elements, the gearbox establishes ten forward speed ratios and one reverse speed ratio between turbine shaft 18 and output shaft 20. The transmission utilizes four simple planetary gear sets 40, 50, 60, and 70. Sun gear 46 is fixedly coupled to sun gear 56, carrier 42 is fixedly couple to ring gear 78, ring gear 58 is fixedly coupled to sun gear 66, ring gear 68 is fixedly coupled to sun gear 76, turbine shaft 18 is fixedly coupled to carrier 52, and output shaft 20 is fixedly coupled to carrier 72. Ring gear 48 is selectively held against rotation by brake 80 and sun gears 46 and 56 are selectively held against rotation by brake 82. Turbine shaft 18 is selectively coupled to ring gear 68 and sun gear 76 by clutch 84. Intermediate shaft 36 is selectively coupled to carrier 62 by clutch 86, selectively coupled to carrier 42 and ring gear 78 by clutch 88, and selectively coupled to ring gear 58 and sun gear 66 by clutch 90. A suggested ratio of gear teeth for each planetary gear set is listed in Table 1.

TABLE 1

| | |
|---|---|
| Ring 48/Sun 46 | 2.20 |
| Ring 58/Sun 56 | 1.75 |
| Ring 68/Sun 66 | 1.60 |
| Ring 78/Sun 76 | 3.70 |

As shown in Table 2, engaging the clutches and brakes in combinations of four establishes ten forward speed ratios and one reverse speed ratio between turbine shaft 18 and output shaft 20. An X indicates that the shift element is required to establish the speed ratio. An (X) indicates the shift element can be applied but is not required to establish the power flow path. In $1^{st}$ gear, either clutch 88 or clutch 90 can be applied instead of applying clutch 86 without changing the speed ratio, or only brakes 80 and 82 and clutch 84 may be engaged. When the gear sets have tooth numbers as indicated in Table 1, the speed ratios have the values indicated in Table 2. Neutral states are established by engaging fewer shift elements than required to establish a power flow path.

TABLE 2

| | A 80 | B 82 | C 90 | D 86 | E 84 | F 88 | Ratio | Step |
|---|---|---|---|---|---|---|---|---|
| Rev | X | X | | X | | X | −4.79 | 102% |
| Park | X | X | X | | | | | |
| $1^{st}$ | X | X | | (X) | X | | 4.70 | |
| $2^{nd}$ | X | X | X | X | | | 2.99 | 1.57 |
| $3^{rd}$ | X | | X | X | X | | 2.18 | 1.37 |
| $4^{th}$ | X | | X | X | | X | 1.80 | 1.21 |
| $5^{th}$ | X | | X | | X | X | 1.54 | 1.17 |
| $6^{th}$ | X | | | X | X | X | 1.29 | 1.19 |
| $7^{th}$ | | | X | X | X | X | 1.00 | 1.29 |
| $8^{th}$ | | X | | X | X | X | 0.85 | 1.17 |
| $9^{th}$ | | X | X | | X | X | 0.69 | 1.24 |
| $10^{th}$ | | X | X | X | | X | 0.64 | 1.08 |

When the vehicle is stationary with the Drive mode selected via shift selector 34 and brake pedal 32 pressed, the controller commands engine 10 to produce enough torque to maintain the engine at a predetermined idle speed. The engine torque required to maintain idle speed depends upon the speeds of transmission input shaft 12 and turbine shaft 18. In this condition, since the driver does not desire wheel torque, the controller may disengage a shift element to place the gearbox in neutral. For example, if the gearbox was in 1st gear as the vehicle slowed to a stop, the controller may disengage one of shift elements 80, 82, or 84 to place the gearbox in a neutral state. With gearbox 16 in neutral, turbine shaft 18 will accelerate to the same speed as transmission input shaft 12 such that torque converter 14 does not resist the rotation of transmission input shaft 12. This reduces the load on the engine, reducing fuel consumption.

When the driver releases brake pedal 32 or depresses accelerator pedal 30, the controller re-engages the shift element to re-establish the 1st gear power flow path. The controller accomplishes this by commanding a gradually increasing pressure to the shift element apply chamber to gradually increase the torque capacity. As the torque capacity of the shift element increases, the speed of turbine shaft 18 decreases such that torque converter 14 again transmits and multiplies torque from transmission input shaft 12 to turbine shaft 18.

When the driver depressed accelerator pedal 30, controller 28 usually commands engine 10 to produce a torque level that is a function of the position of accelerator pedal 30. This torque level is called driver demanded torque. The driver demanded torque may also be a function of other parameters, such as the speed of transmission input shaft 12 and/or the speed of transmission output shaft 20. However, if the driver depresses accelerator pedal 30 before the 1st gear power flow path is fully re-established, then it may be desirable to command a torque less than driver demanded torque.

During the transition from neutral to 1st gear, the elements selectively coupled by the shift element are rotating with respect to one another. Heat is generated at the friction interface at a rate that is proportional to the shift element torque capacity and the relative speed. If the controller transitions from idle control to driver demand control of engine torque during this transition, then the engine speed will increase. The increase in engine speed tends to increase the turbine speed and the turbine torque. This increases both the rate of heat generation in the oncoming shift element and increases the duration of the transition, substantially increasing the total amount of heat that must be absorbed by the shift element. In some cases, the quantity of heat may exceed the shift elements ability to store and dissipate the heat, causing the shift element to become excessive hot.

On the other hand, setting the engine torque level too low during the transition may also be problematic. If the engine torque is too low, then the turbine will be decelerating as the engagement completes. In that situation, a large fraction of the input torque to the gearbox is actually attributable to the inertia of the turbine as opposed to being attributable to power transmitted from the engine. Following, the engagement, the turbine speed will be proportional to the vehicle speed, which is increasing, so the contribution of turbine inertia to the gearbox input torque goes away (actually becomes slightly negative). This can cause vehicle acceleration to suddenly decrease. A higher engine torque just before engagement avoids this scenario by causing the turbine to be at a constant or slightly increasing speed just before the engagement completes.

Figure 3:
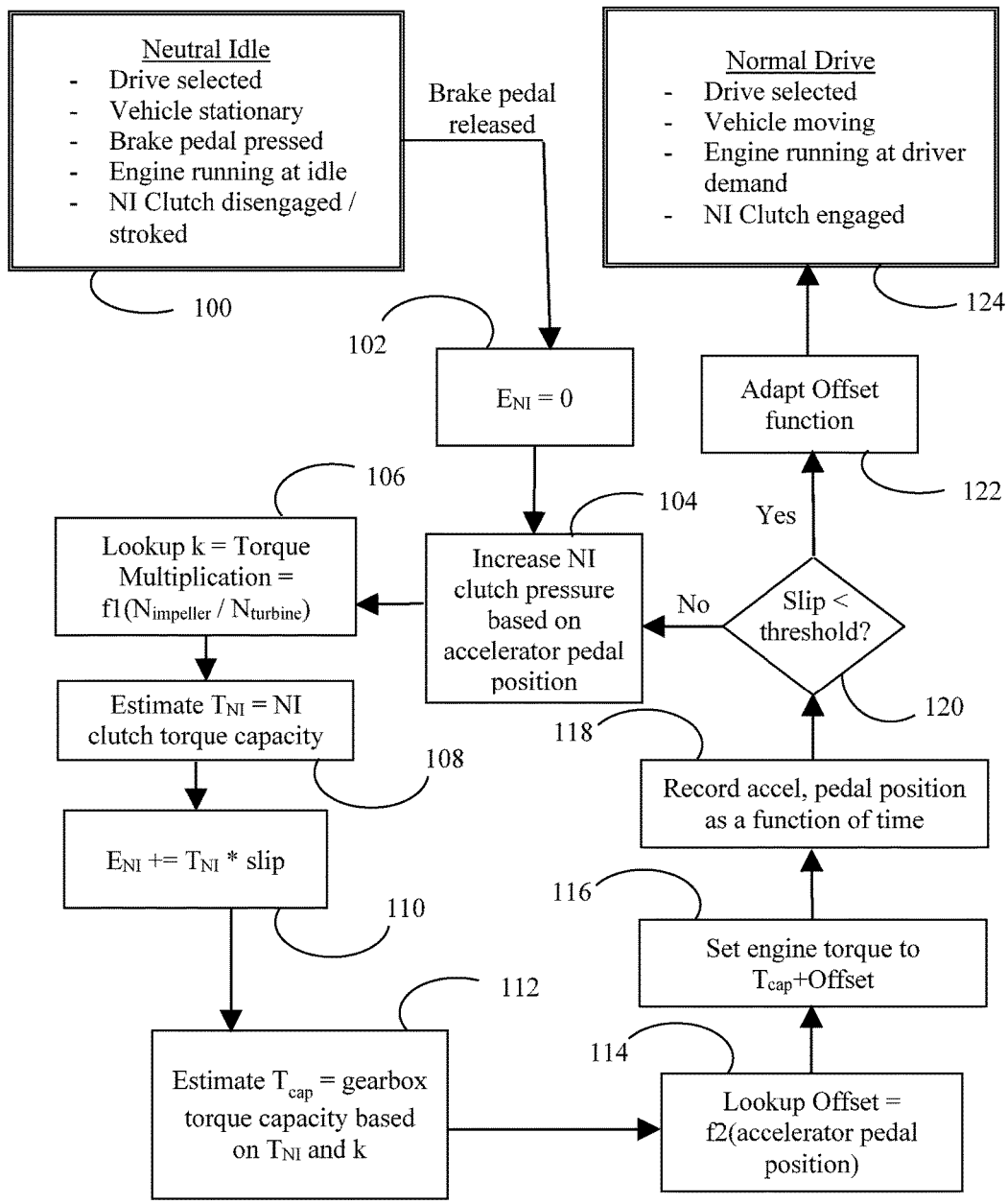
FIG. 3 is a flowchart illustrating a method of transitioning from a neutral idle state to an engaged state.

FIG. 3 illustrates a process for controlling a powertrain during a transition from a neutral idle condition to a normal drive condition. The process begins in Neutral Idle state 100. In Neutral Idle state, Drive mode is selected using shift selector 34, brake pedal 32 is depressed, and the vehicle is stationary. In Neutral Idle state, the controller is controlling the engine to maintain a predetermined target idle speed. One of the shift elements that is required to establish the 1st gear power flow path is disengaged. This shift element is called the Neutral Idle (NI) clutch. The pressure to the apply chamber of the NI clutch may be set to keep the piston stroked at minimal torque capacity.

The process transitions out of Neutral Idle state 100 in response to release of the brake pedal. During the transition, the controller keeps track of how much energy is being dissipated into the NI clutch. This is initialized at 102. At 104, the commanded pressure to the apply chamber of the NI clutch is incremented. The size of the increment is greater when the accelerator pedal is depressed farther, causing a more rapid re-engagement. At 106, the controller utilizes measured speeds of the shaft 12 ($N_{impeller}$) and 18 ($N_{turbine}$) and a table to estimate the torque converter torque ratio (k). At 108, the controller estimates the torque capacity of the NI clutch based on the commanded pressure from 104. At 110, the controller increments the NI clutch energy to account for energy dissipated since the previous loop. At 112, the controller calculates the transmission clutch (Tcap) by multiplying $T_{NI}$, k, and any torque ratio between the NI clutch and the turbine. At 114, the controller looks up an Offset in a table based on the accelerator pedal position. For low degrees of accelerator pedal depression, the Offset may be a negative number. The Offset generally increases for higher degrees of accelerator pedal depression. At 116, the controller commands the engine to produce torque equal to the sum of the transmission torque capacity, $T_{cap}$, and the Offset. At 118, the controller measures and records the acceleration of the output shaft and the pedal position. The acceleration may be measured, for example, by taking the derivative of an output shaft speed measurement or by directly reading an accelerometer. These measurements will be used in an adaptation step described later. At 120, the controller checks whether the slip across the NI clutch is close to zero (within a threshold of about 5 rpm). If not, the process repeats beginning from 104. Once the slip is near zero at 120, the controller executes an adapt function described below at 122 and proceeds to state Normal Drive 124. In normal drive state, the engine torque command is based on the normal driver demand function.

Figure 4:
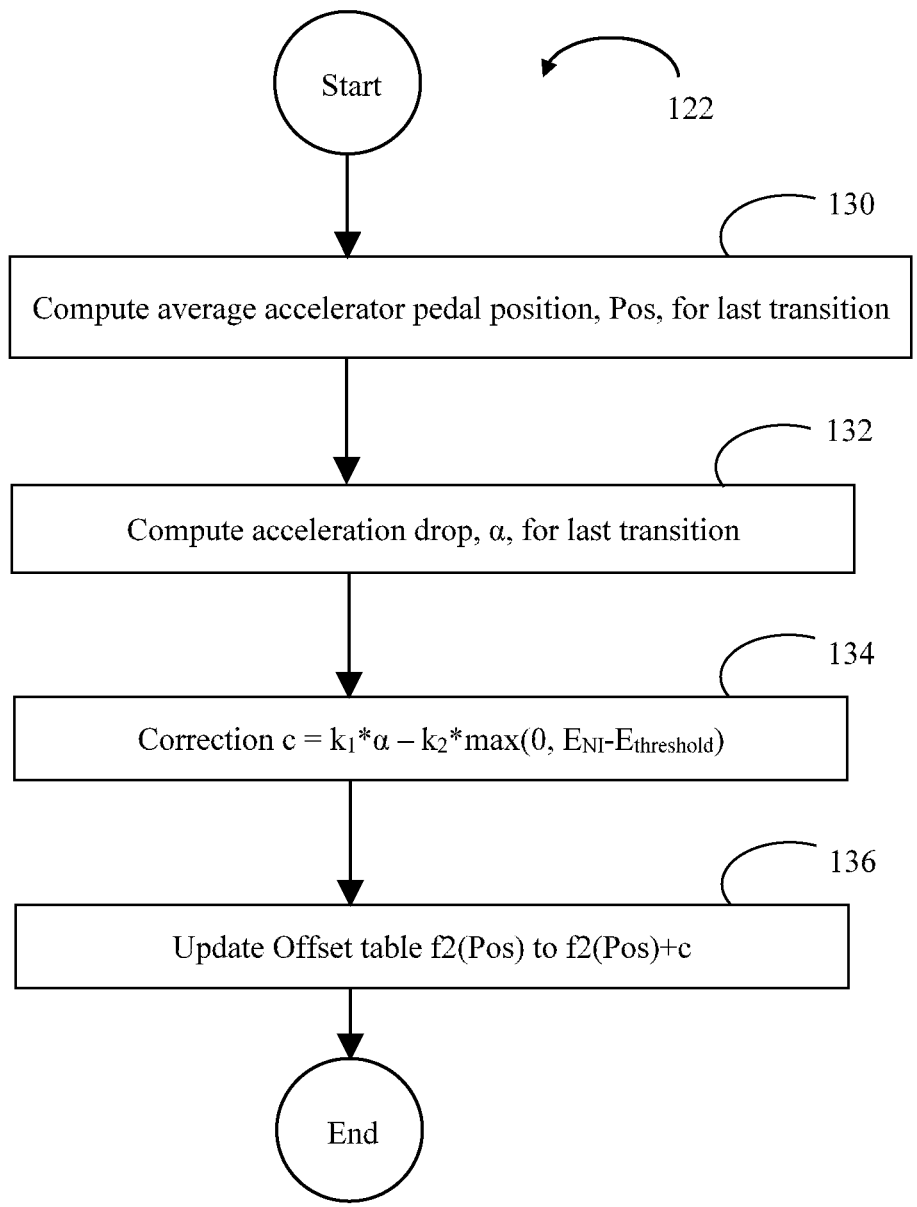
FIG. 4 is a flowchart illustrating a method of adapting a function used in the method of FIG. 3.

FIG. 4 illustrates the process executed at 122 to adapt the Offset function. At 130, the controller computes the average accelerator pedal position during the preceding transition using the values recorded at step 118 of FIG. 3. At 132, the controller computes an acceleration drop for the preceding transition using the values recorded at step 118 of FIG. 3. The acceleration drop may be computed as follows. A peak acceleration value may be determined by taking a maximum of the recorded acceleration values for a time interval near the end of the transition, such as between 0.15 second before the end of the transition and 0.1 seconds after the end of the transition. The acceleration drop may be determined by taking the difference between the peak acceleration value and the minimum acceleration value between the time of the peak and the end of the interval. At 134, a correction factor is calculated based on the acceleration drop and the clutch energy associated with the preceding transition, which was calculated at step 110 of FIG. 3. The formula for calculating the correction factor includes two predetermined positive coefficients, $k_1$ and $k_2$, which determine the magnitude of the adjustment based on acceleration drop and clutch energy respectively. The first term in the formula increases the Offset for future events based on the acceleration drop, tending to reduce the acceleration drop. The second term decreases the Offset whenever the clutch energy exceeds a threshold, tending to reduce the clutch energy in future events. If the acceleration drop and the clutch energy are basically in balance according to the selected values for $k_1$, $k_2$, and $E_{threshold}$, then the correction factor is near zero. At 136, the table that represents the Offset function is updated. Various methods are known for updating a function represented by a table. For example, only the tabulated value nearest Pos may be updated, or the tabulated values on either side of Pos may be updated, or other values near Pos may also be updated by lesser amounts.

The result of the adaptation is to gradually modify the Offset function such that the commanded engine torque during a transition from neutral idle appropriately balances the acceleration drop with the clutch energy at each different accelerator pedal position. Specifically, if the clutch energy is less than the target $E_{threshold}$, then the commanded engine torque during subsequent transitions be higher. The rate of increase over a sequence of transitions is based on the magnitude of the acceleration drop. If the clutch energy substantially exceeds $E_{threshold}$, the commanded engine torque for subsequent transitions will be lower.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:
1. A method of controlling a vehicle powertrain comprising:
    disengaging a shift element in response to a vehicle stopping in a drive mode to place a transmission in a neutral state;

in response to release of a brake pedal or depression of an accelerator pedal, commanding an increase in a torque capacity of the shift element to transition from the neutral state to an engaged state; and during the transition from the neutral state to the engaged state, commanding an engine torque equal to a sum of a transmission torque capacity and an offset, wherein the offset is a function of an accelerator pedal position.

2. The method of claim 1 further comprising calculating the transmission torque capacity by multiplying the torque capacity of the shift element by a torque converter torque multiplication ratio.

3. The method of claim 2 wherein calculating the transmission torque capacity further comprises multiplying by a torque ratio between the shift element and a turbine shaft.

4. The method of claim 1 wherein a rate of increase of the torque capacity of the shift element during the transition is based on the accelerator pedal position.

5. The method of claim 1 further comprising, in response to a clutch energy during the transition exceeding a threshold, decreasing the offset such that, during a subsequent transition from the neutral state to the engaged state at the same accelerator pedal position, a lower engine torque is commanded.

6. The method of claim 5 further comprising, in response to the clutch energy during the transition not exceeding the threshold, increasing the offset such that, during the subsequent transition from the neutral state to the engaged state at the same accelerator pedal position, a higher engine torque is commanded.

7. The method of claim 6 wherein the offset is increased by an amount that is proportional to an acceleration drop during the transition.

8. A powertrain control method comprising:
while a drive mode is selected, transitioning from a neutral state to an engaged state by increasing a shift element torque capacity; and
during the transition, commanding an engine torque equal to a sum of a transmission torque capacity and an offset, wherein the transmission torque capacity is a function of the shift element torque capacity and the offset is a function of an accelerator pedal position.

9. The powertrain control method of claim 8 wherein a rate of increase of the shift element torque capacity during the transition is based on the accelerator pedal position.

10. The powertrain control method of claim 8 further comprising, in response to a clutch energy during the transition exceeding a threshold, decreasing the offset such that, during a subsequent transition from the neutral state to the engaged state at the same accelerator pedal position, a lower engine torque is commanded.

11. The powertrain control method of claim 8 further comprising, in response to a clutch energy during the transition not exceeding a threshold, increasing the offset such that, during a subsequent transition from the neutral state to the engaged state at the same accelerator pedal position, a higher engine torque is commanded.

12. The powertrain control method of claim 11 wherein the offset is increased by an amount that is proportional to an acceleration drop during the transition.

13. A powertrain comprising:
an engine;
a transmission; and
a controlled programmed to
shift the transmission from a neutral state to an engaged state by increasing a torque capacity of a shift element to increase a transmission torque capacity, and
during the shift, command an engine torque equal to a sum of the transmission torque capacity and an offset, wherein the offset is a function of an accelerator pedal position.

14. The powertrain of claim 13 wherein the controller is programmed to increase the torque capacity of the shift element during the shift at a rate based on the accelerator pedal position.

15. The powertrain of claim 13 wherein the controller is further programmed to, in response to a clutch energy during the shift exceeding a threshold, command a lower engine torque during a subsequent shift from the neutral state to the engaged state at the same accelerator pedal position.

16. The powertrain of claim 13 wherein the controller is further programmed to, in response to a clutch energy during the shift not exceeding a threshold, command a higher engine torque during a subsequent shift from the neutral state to the engaged state at the same accelerator pedal position.

17. The powertrain of claim 16 wherein the difference between the commanded engine torque during the subsequent shift and the commanded engine torque during the shift is proportional to an acceleration drop during the shift.

* * * * *